US012603797B2

(12) United States Patent
Kilkenny et al.

(10) Patent No.: US 12,603,797 B2
(45) Date of Patent: Apr. 14, 2026

(54) METHOD FOR OPERATING A RING COMMUNICATION NETWORK

(71) Applicant: Caterpillar Inc., Peoria, IL (US)

(72) Inventors: Michael Jordan Kilkenny, Peoria, IL (US); Matthew Lee Boggs, Metamora, IL (US); Daniel Mark Jessup, Thorney (GB); Keith Nicholas Troisi, Dunlap, IL (US); Michael David Smith, Huntingdon (GB); Jared James Brodbeck, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 13 days.

(21) Appl. No.: 18/743,635

(22) Filed: Jun. 14, 2024

(65) Prior Publication Data

US 2025/0385811 A1 Dec. 18, 2025

(51) Int. Cl.
*H04L 12/423* (2006.01)
*H04L 41/14* (2022.01)

(52) U.S. Cl.
CPC ............ *H04L 12/423* (2013.01); *H04L 41/14* (2013.01)

(58) Field of Classification Search
CPC ........... H04L 2012/40273; H04L 67/12; H04L 12/437; H04L 12/42; H04L 12/422; H04L 12/4637; H04L 2012/421; H04L 45/12; H04L 45/22; B60R 16/023; B60R 16/0207; B60R 16/03; B60R 16/0238; B60R 16/0239; B60R 16/033; Y02E 60/10; G06F 11/2015; H01M 2010/4271; H01M 2010/4278; H01M 10/4257; H01M 2220/20

See application file for complete search history.

(56) References Cited

U.S. PATENT DOCUMENTS

| | | | | |
|---|---|---|---|---|
| 7,760,669 | B2 | 7/2010 | Heil et al. | |
| 8,010,771 | B2 | 8/2011 | Inagaki et al. | |
| 9,077,641 | B2 * | 7/2015 | Reich | H04L 41/145 |
| 9,568,534 | B2 * | 2/2017 | Martin | G01R 31/54 |
| 9,755,907 | B2 | 9/2017 | Cavanna et al. | |
| 10,700,889 | B2 * | 6/2020 | Ross | H04L 12/437 |
| 10,800,361 | B2 * | 10/2020 | Nakamura | B60R 16/0207 |
| 11,251,991 | B2 | 2/2022 | Kajino | |
| 11,277,279 | B2 | 3/2022 | Hoglund et al. | |
| 11,472,353 | B2 * | 10/2022 | Yasunori | H01R 13/665 |
| 11,622,250 | B2 * | 4/2023 | Hirano | H04L 12/403 |
| | | | | 701/48 |

(Continued)

FOREIGN PATENT DOCUMENTS

WO 2021034680 A1 2/2021

*Primary Examiner* — Alex Tran

(57) ABSTRACT

A method of operating a ring communication network, including providing a management device having a first processor, a first memory, a first communicator, and a computer program stored in the first memory and capable of running on the first processor; providing a network device having a network processor, a network memory, and a network communicator; disposing an auxiliary memory in the network device; organizing the management device and the network device to form the ring communication network; determining a location of the auxiliary memory in the ring communication network; and assigning a transmission direction such that a transmission distance between the management device and the auxiliary memory is minimized.

20 Claims, 6 Drawing Sheets

(56)     References Cited

U.S. PATENT DOCUMENTS

| | | | | |
|---|---|---|---|---|
| 12,122,309 | B2 * | 10/2024 | Bauer | ................. G06F 11/2007 |
| 12,149,379 | B2 * | 11/2024 | Wang | .................... H04L 12/437 |
| 12,255,757 | B2 * | 3/2025 | Yasunori | .............. H04L 12/437 |
| 2008/0066981 | A1 * | 3/2008 | Carabelli | ............. H04L 12/437 |
| | | | | 180/242 |
| 2014/0122777 | A1 | 5/2014 | Oh et al. | |
| 2019/0366872 | A1 * | 12/2019 | Kanamori | ............... H02J 1/106 |
| 2021/0309167 | A1 * | 10/2021 | Gourari | ................. G06V 20/56 |
| 2022/0294663 | A1 | 9/2022 | He et al. | |
| 2022/0381809 | A1 * | 12/2022 | Yamada | .............. G01R 31/085 |
| 2024/0422027 | A1 * | 12/2024 | Lengyel | ............. H04L 12/4645 |

* cited by examiner

METHOD FOR OPERATING A RING COMMUNICATION NETWORK

TECHNICAL FIELD

The present disclosure generally relates to digital data processing, and in particular to the design and operation of ring data networks.

BACKGROUND

Modern computer systems are complex, usually having many sub-parts or subsystems, each of which may be concurrently performing different functions in a cooperative, although partially autonomous, manner. Computer systems may be utilized to perform a variety of desired functions and tasks. Some computer systems are used primarily as servers, in which multiple users (who may be geographically isolated, using a mixture of computer systems and application software) access a centralized set of applications and common database. Other computer systems are used primarily as single-user devices, in which a single user performs a set of applications of interest to the user, locally stores data of interest to the user, and may optionally communicate with other computers as required to access external data. Still other computer systems may perform specialized functions, such as monitoring and controlling physical sensors, switches, motors, valves, and other controls.

In complex networks, there is a general need to communicate data among different computer systems or components thereof. Data communication occurs among different digital computer systems, utilizing internet communication or in a local area network; among different components of a single digital computer system; or even within the functional elements of a single integrated circuit chip, which is itself part of a larger computer system.

One known technique for supporting data communication among more than two devices is a ring network. A ring network is a packet-based communications network containing a set of point-to-point communication links, each running between of pair of systems, devices, or functional components or subcomponents thereof. These may be generally referred to as nodes of the network. In a ring network, the links may be arranged to form a ring which includes all the nodes of the network. A first node, wishing to transmit a packet to a second node, transmits the packet to the first node's immediate neighbor on the ring, which then forwards the packet along the ring, until the packet reaches the second node.

However, ring networks may present several challenges. In order to transmit data, each node must accurately determine a datalink or dataflow direction. Often, datalink or dataflow detection involves multiple electronics chips on a single device attempting to communicate with multiple other electronics chips on other devices, or nodes of the ring network. In this scenario, it may be difficult to determine at any instant which device is communicating with another device to transfer data, and a ring network of this type may create an ambiguity which can lead to data being sent to the wrong destination device.

Ring networks may be provided in many applications. One such application may be in vehicles that derive electromotive power from batteries, where a battery management unit (BMU) may control how data is moved between multiple battery packs. The battery management unit may accomplish this by sending both a control signal and a maintenance signal to each of a plurality of battery packs arranged in a ring network. The control signal may be utilized to control the voltage output of each of the battery packs through a battery computer mounted on each of the battery packs. Through utilization of the ring network, the battery management unit may re-order the way data is moved across battery packs in real time. Additionally, battery packs may be consumable products, requiring occasional disassembly and service to smaller components. Once a battery pack is removed from a ring network, serviced, and replaced, the battery management unit may be utilized to ensure that through the maintenance signal, that each battery pack is in a proper working condition.

In light of the aforementioned shortcomings, there is a need for a method of operating a ring communication network that adds simplicity in determining a dataflow direction. There is also a need for a battery management system that can utilize this method in simplifying communication architecture between battery packs.

SUMMARY OF THE DISCLOSURE

In accordance with one aspect of the disclosure, a method of operating a ring communication network may be provided. The method may include providing a management device having a first processor, a first memory, a first communicator, and a computer program stored in the first memory and capable of running on the first processor. The method may include providing a network device having a network processor, a network memory, and a network communicator, and may include disposing an auxiliary memory in the network device. The method may include organizing the management device and the network device to form the ring communication network. The method may include determining a location of the auxiliary memory in the ring communication network. The method may include assigning a transmission direction such that a transmission distance between the management device and the auxiliary memory is minimized.

In accordance with another aspect of the disclosure, a battery management system may be provided. The battery management system may include a battery management unit, including a management computer, and may include a cell monitoring unit, including a battery computer and an auxiliary memory chip. The battery management system may include a communication interface between the battery management unit and the cell monitoring unit, the communication interface organized such that the battery management system is organized in a ring communication network. The battery management unit may further be configured to determine if the cell monitoring unit is no longer in working condition. The battery management unit may accomplish this by first determining a location of the auxiliary memory chip in the ring communication network. The battery management unit may then assign a transmission direction along the ring communication network such that a distance between the management computer and the auxiliary memory chip is minimized. The battery management unit may then send a management signal from the battery management unit to the cell monitoring unit along the ring communication network in the transmission direction.

In accordance with yet another aspect of the disclosure, a vehicle may be provided. The vehicle may include a frame, an operator cabin mounted on the frame, and a controller configured to control operation of the vehicle. The vehicle may include a battery management unit mounted to the frame and connected to the controller, including a management computer, and a cell monitoring unit mounted to the frame, including a battery computer and an auxiliary memory chip. The vehicle may include a communication interface connecting the battery management unit and the cell monitoring unit, configured such that the battery management unit and the cell monitoring unit are organized in a ring communication network. The battery management unit of the vehicle may be configured to determine if the cell monitoring unit is no longer in working condition.

These and other aspects and features of the present disclosure will be more readily understood when read in conjunction with the accompanying drawings.

DETAILED DESCRIPTION

Figure 1:
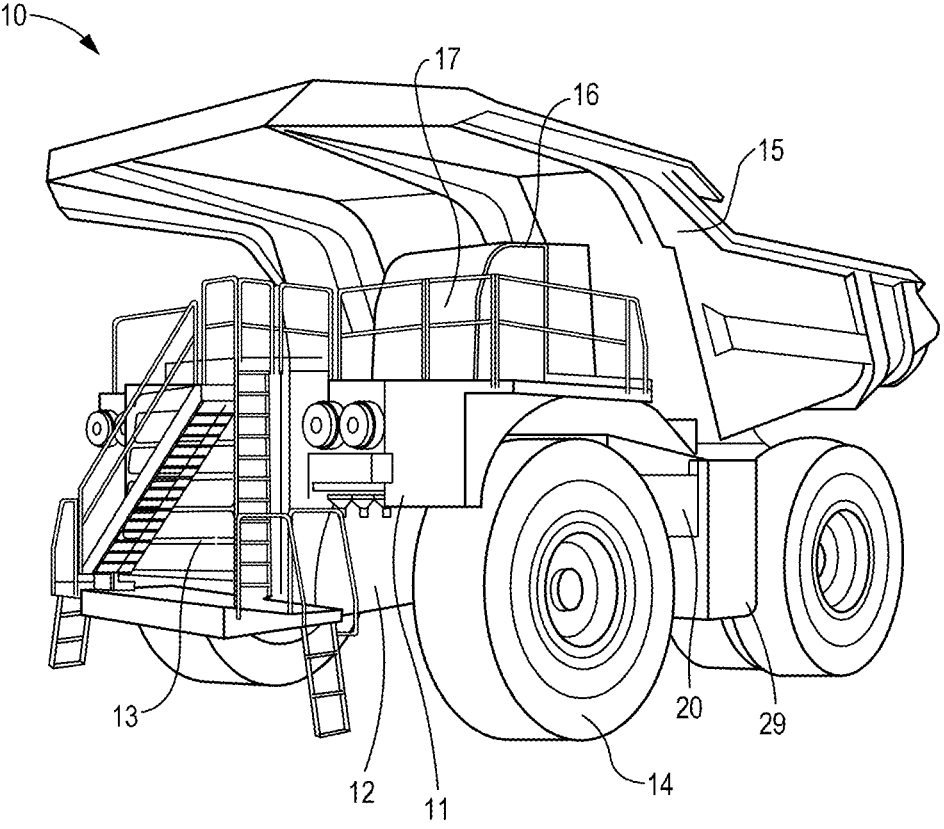
FIG. 1 is a perspective view of a vehicle constructed in accordance with an embodiment of the present disclosure.

Referring now to the drawings, and with specific reference to FIG. 1, a vehicle is depicted and generally referred to using reference numeral 10. The vehicle 10 is exemplarily embodied in the form of a work machine, and more specifically, a mining truck. While the vehicle 10 is depicted as a mining truck, it should be noted that a type of vehicle used is merely exemplary and illustrative in nature. It will be acknowledged that the teachings of the present disclosure can be similarly applied to other types of vehicles and, including but not limited to on and off highway vehicles, work machines, power generators, and other types of machine systems utilizing power delivered from strings of batteries known to persons skilled in the art.

The vehicle 10, in the instance shown as a mining truck, may be used to transport material within mining sites. The vehicle 10 is supported by a frame 11. The vehicle 10 may include a drivetrain 12 powered by a engine 13 and driving ground-engaging members 14 contacting the ground and supporting the frame 11 in order to operate the vehicle 10. The vehicle 10 may also include an implement 15 to perform a work job. In the view of FIG. 1, since the vehicle 10 is a mining truck, the implement 15 is exemplarily depicted as a dump body, but the implement may be other types of work implements, or may not be present, as known to persons skilled in the art. The vehicle 10 may also include an operator cabin 16 for an operator to control the operation of the vehicle 10. The operator cabin 16 may include a control module 17 for the operator to use to direct the vehicle 10. The vehicle 10 may also include a battery management unit 20 for controlling the operation of a battery pack 29 in order to power the electrical systems of the vehicle 10.

Figure 2:
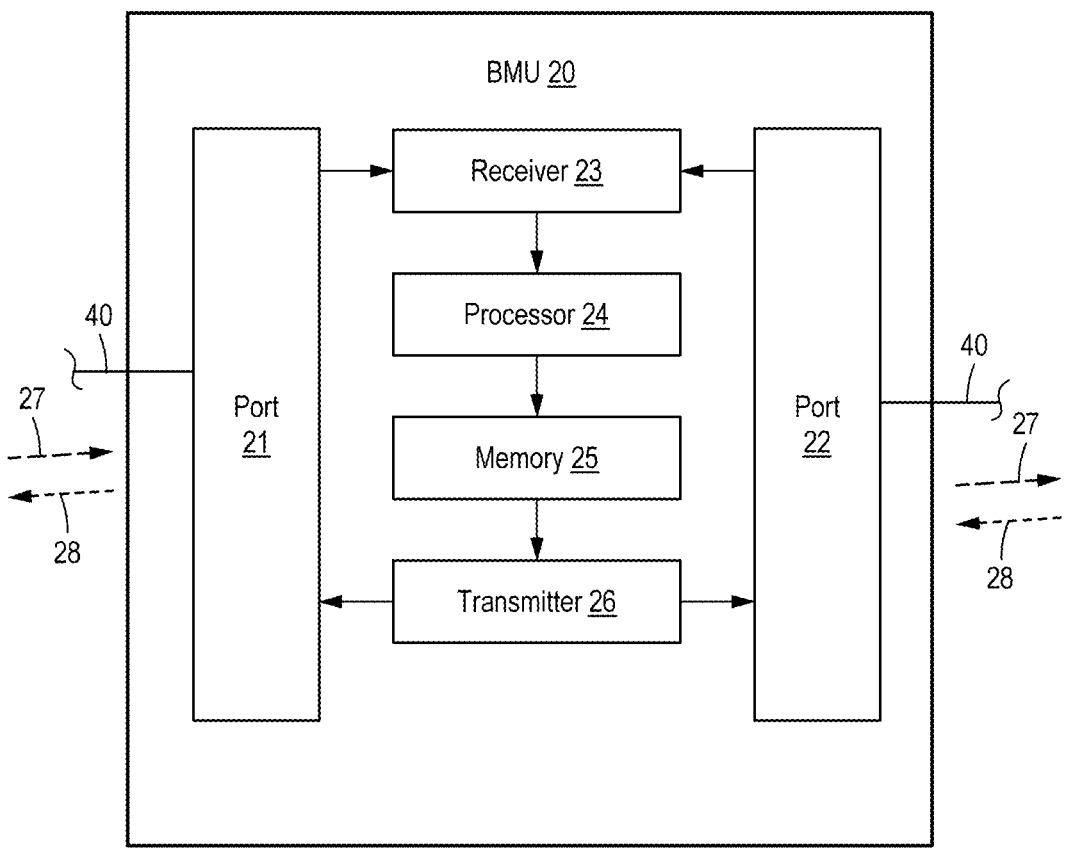
FIG. 2 is a schematic view of a battery management unit constructed in accordance with an embodiment of the present disclosure.

FIG. 2 depicts an exemplary embodiment of the battery management unit 20 of the vehicle 10. The battery management unit 20 is a computer, and thus may include a first port 21 and a second port 22 for receiving information from a communication interface 40. In an exemplary embodiment, the communication interface 40 may be an isolated serial peripheral interface, operating using isolated serial peripheral interface communication protocol. However, other communication interfaces as known may be utilized.

The first port 21 and the second port 22 collect data via a receiver 23. The data is interpreted by a processor 24 and a memory 25 of the battery management unit 20, and then sends data back out via a transmitter 26. The processor 24 may include a central processing unit (CPU) or a micro processing unit (MPU), which executes any programming stored within the memory 25, which may include a random-access memory (RAM).

Figure 4:
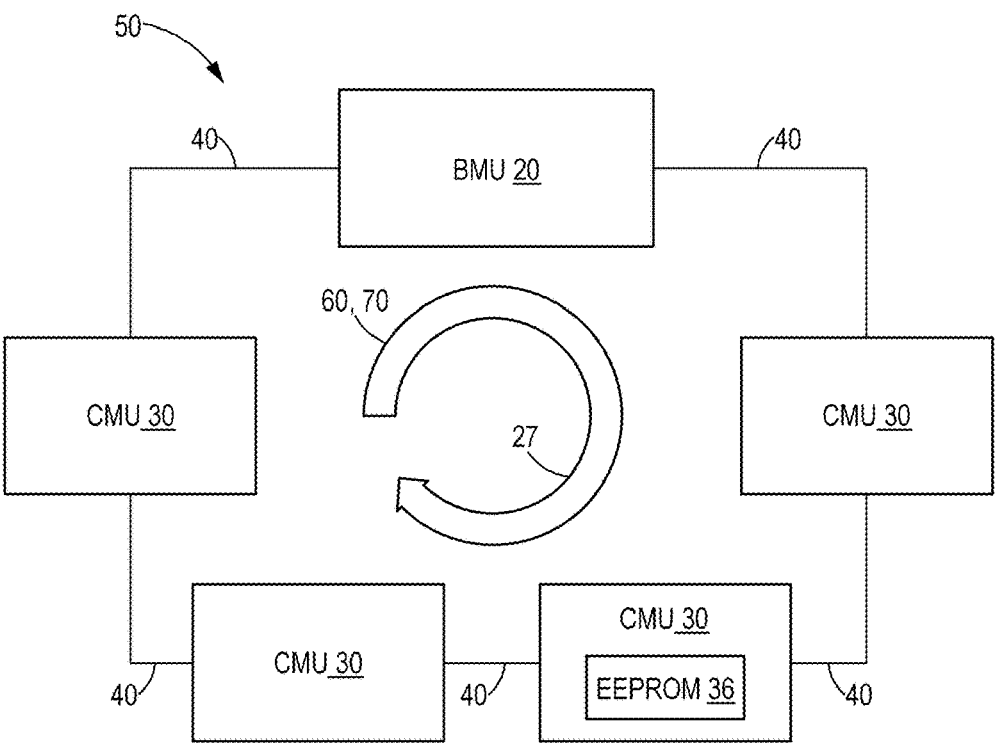
FIG. 4 is a schematic view of a battery management system arranged in a ring communication network constructed in accordance with an embodiment of the present disclosure.
Figure 5:
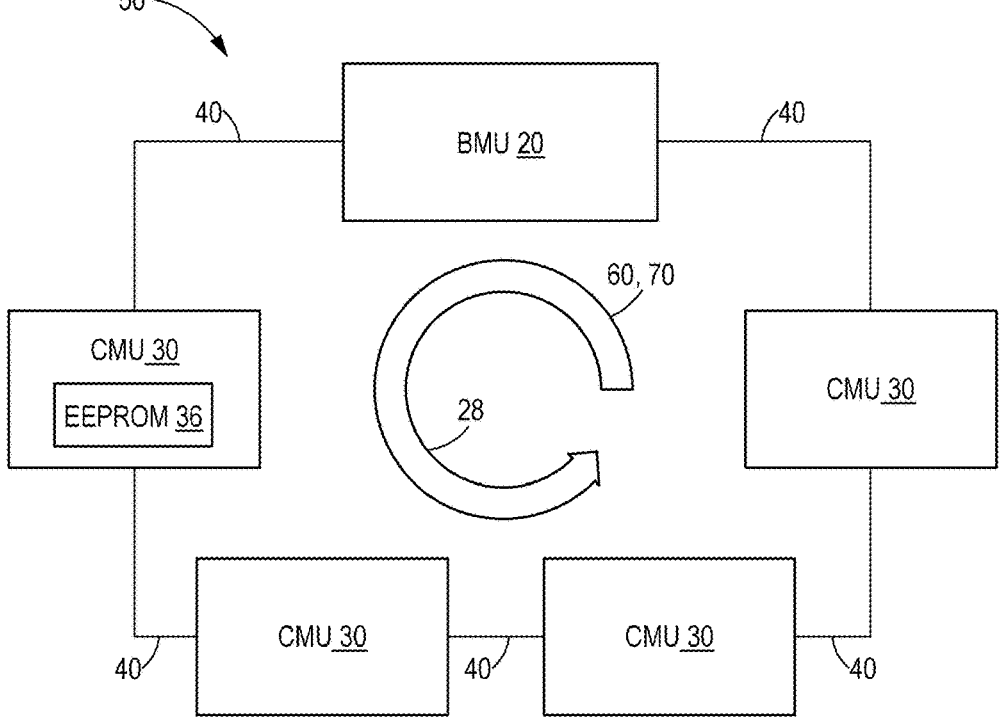
FIG. 5 is a schematic view of a battery management system arranged in a ring communication network constructed in accordance with an embodiment of the present disclosure.

The battery management unit 20 is shown in FIGS. 4-5 as positioned in a battery management system orientated in a ring communication network 50. Data may be shared along the ring communication network 50 in either a clockwise direction 27, or a counter-clockwise direction 28. When data is shared in the clockwise direction 27, the battery management unit 20 receives data from the first port 21, and sends data out from the second port 22. Conversely, when data is shared in the counter-clockwise direction 28, the battery management unit 20 receives data from the second port 22, and sends data out from the first port 21.

Figure 3:
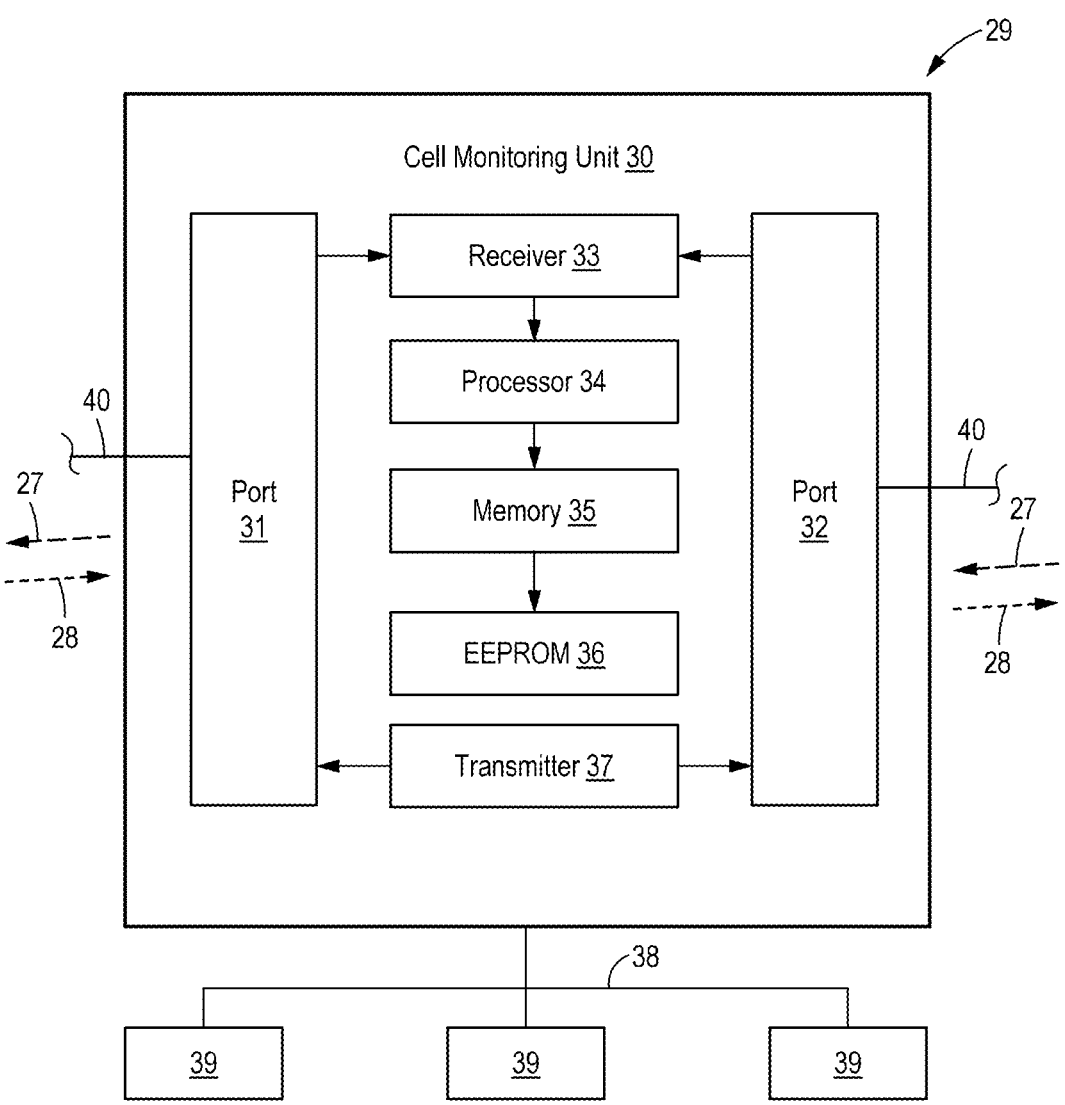
FIG. 3 is a schematic view of a battery pack constructed in accordance with an embodiment of the present disclosure.

FIG. 3 depicts an exemplary embodiment of the battery pack 29, which is controlled by the battery management unit 20 through the ring communication network 50. The battery pack 29 may include a computer in the form of a cell monitoring unit 30 for sending and receiving data regarding operation of the battery cells within the battery pack 29. The cell monitoring unit 30 may also include a first battery port 31 and a second battery port 32 for receiving information from the communication interface 40. As with the battery management unit 20, the communication interface 40 connected to the cell monitoring unit 30 may also be an isolated serial peripheral interface communication protocol. However, other communication interfaces as known may be utilized.

As with the battery management unit 20, the first battery port 31 and the second battery port 32 collect data via a receiver 33. The data is interpreted by a processor 34 and a memory 35 of the cell monitoring unit 30, and then sends data back out via a transmitter 37. Again, the processor 34 may include a central processing unit (CPU) or a micro processing unit (MPU), which executes any programming stored within the memory 35, which may include a random-access memory (RAM).

The cell monitoring unit 30 includes a cell connector 38, which connects the cell monitoring unit 30 with a plurality of battery cells 39. As depicted in FIG. 3, the cell monitoring unit 30 includes three cells, however, the plurality of battery cells 39 may include any number of cells as known and required for a given configuration of the battery pack.

The cell monitoring unit 30 may also include an auxiliary memory chip 36. In the exemplary embodiment, the auxiliary memory chip is depicted as an electrically erasable programmable read-only memory (EEPROM), however, any other form of memory chips as known may be utilized. A single auxiliary memory chip 36 may be provided in the ring communication network 50, or each of the cell monitoring unit 30 may be provided with the auxiliary memory chip 36, and configured to activate a signal using the auxiliary memory chip 36 when a condition is present.

In the normal course of operation, as depicted in FIGS. 4-5, the battery management system is formed in the ring communication network 50. As depicted, the ring communication network 50 includes one of the battery management unit 20 controlling four of the cell monitoring unit 30. However, any number of the cell monitoring unit 30 may be provided in the ring communication network 50 as required. In order to properly transmit data across the ring communication network 50, the battery management unit 20 must determine the location of the auxiliary memory chip 36 within the ring communication network 50. The auxiliary memory chip 36 may present a signal for a given condition, for example, if one of the cell monitoring unit 30 has malfunctioned, or has been reassembled incorrectly. Other conditions triggering the signal of the auxiliary memory chip 36 may be utilized as well.

In the depiction of FIG. 4, the auxiliary memory chip 36 is located by the battery management unit 20 in the cell monitoring unit 30 second from the battery management unit 20 in the clockwise direction 27. The battery management unit 20 determines that transmitting data in the clockwise direction 27 would reach the auxiliary memory chip 36 faster than transmitting data in the counter-clockwise direction 28. Thus, the battery management unit 20 assigns a transmission direction in the clockwise direction 27, and data is communicated along the ring communication network 50 in the clockwise direction 27.

In the depiction of FIG. 5, the auxiliary memory chip 36 is located by the battery management unit 20 in the cell monitoring unit 30 first from the battery management unit 20 in the counter-clockwise direction 28. The battery management unit 20 determines that transmitting data in the counter-clockwise direction 28 would reach the auxiliary memory chip 36 faster than transmitting data in the clockwise direction 27. Thus, the battery management unit 20 assigns a transmission direction in the counter-clockwise direction 28, and data is communicated along the ring communication network 50 in the counter-clockwise direction 28.

Data transmitted by the battery management unit 20 may include both a control signal 60 and a maintenance signal 70. The control signal 60 may be utilized by the battery management unit 20 to control the voltage output of each of the cell monitoring unit 30 through a battery computer mounted on each of the battery packs. The maintenance signal 70 may be utilized by the battery management unit 20 to monitor the condition of each of the cell monitoring unit 30 as a check signal to ensure that each of the battery pack is in proper working order.

Figure 6:
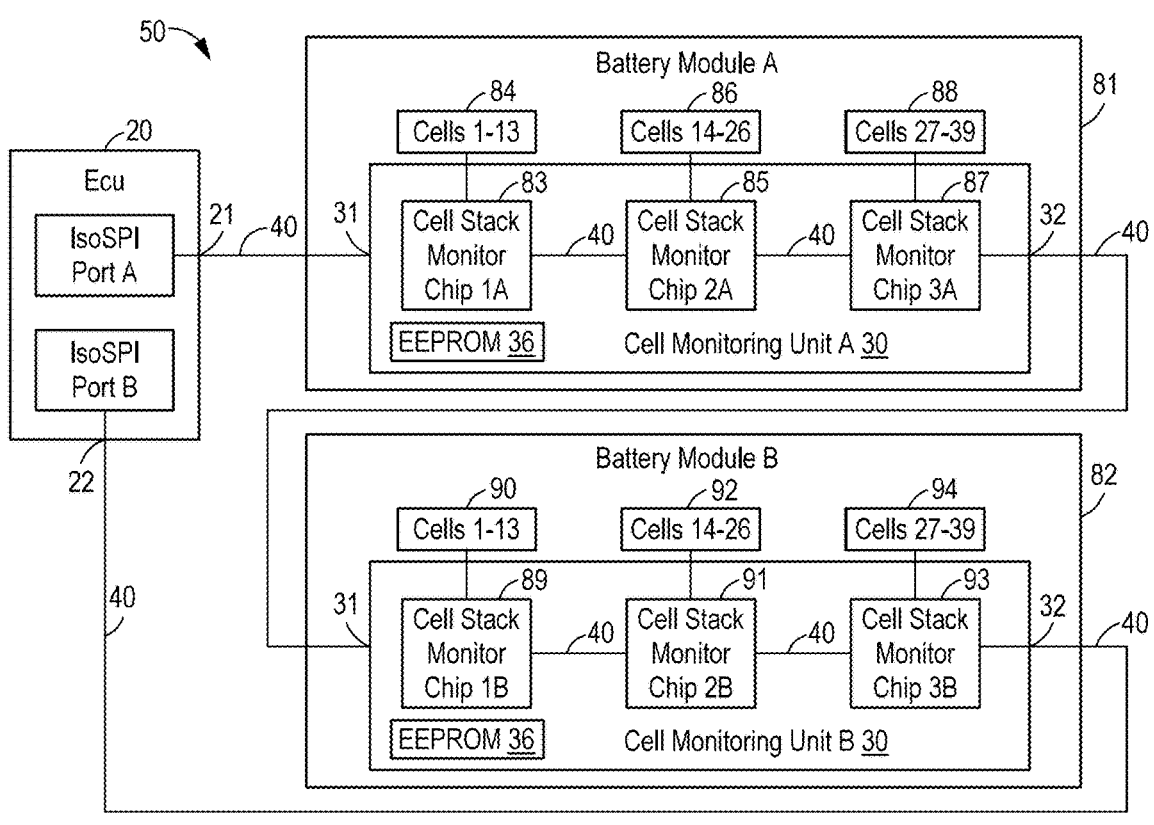
FIG. 6 is a schematic view of a battery management system arranged in a ring communication network constructed in accordance with an embodiment of the present disclosure.
Figure 7:
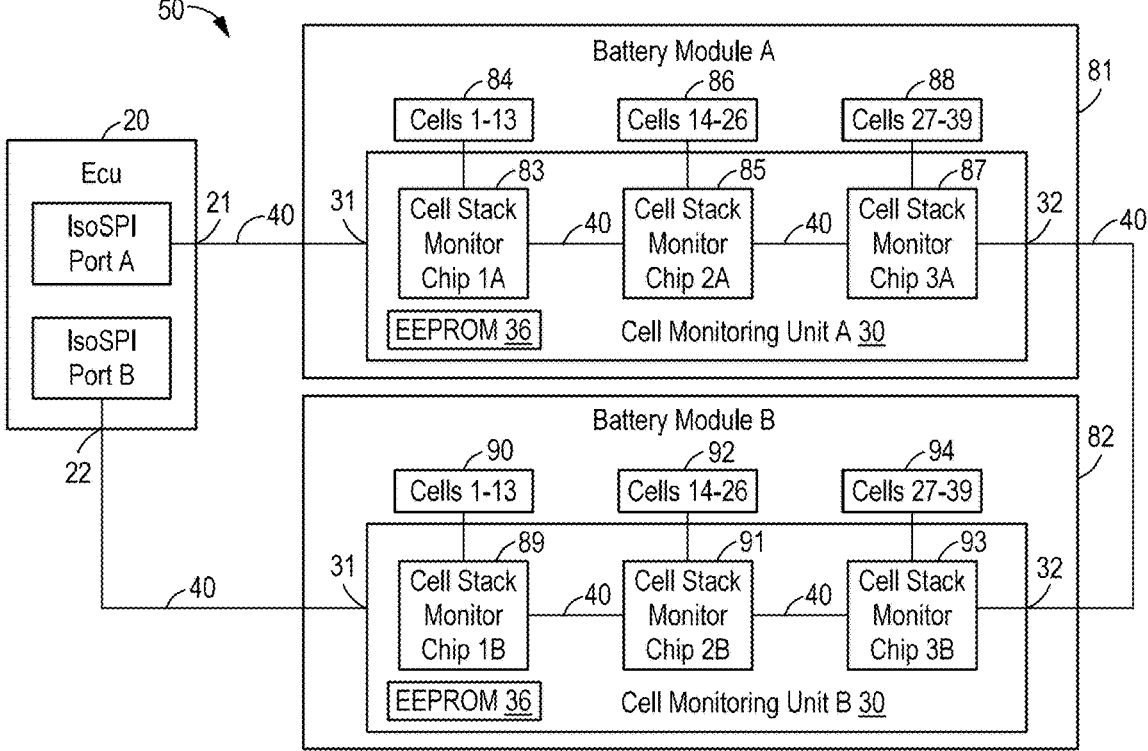
FIG. 7 is a schematic view of a battery management system arranged in a ring communication network constructed in accordance with an embodiment of the present disclosure.

Working condition of the cell monitoring unit 30 and the ring communication network 50 may also include determining that components within the ring communication network 50 are connected in a correct orientation. FIGS. 6-7 depict an exemplary embodiment of the ring communication network 50 in more specific detail as applied to the battery management unit 20 controlling operation of the battery pack 29 of the vehicle 10. In the depiction of FIG. 6, the battery management unit 20 is organized in the ring communication network 50 with two of the cell monitoring unit 30 corresponding to a first battery module 81 and a second battery module 82. In the depiction of FIG. 6, the first battery module 81 is indicated as "Battery Module A" and the second battery module 82 is indicated as "Battery Module B."

FIG. 6 depicts the ring communication network 50 with the components connected as intended by a predetermined configuration stored within the battery management unit 20. The battery management unit 20 is connected by the first port 21 to the first battery port 31 of the first battery module 81 through the communication interface 40. The second battery port 32 of the first battery module 81 is connected to the first battery port 31 of the second battery module 82 through the communication interface 40. Finally, the second battery port 32 of the second battery module 82 is connected to the second port 22 of the battery management unit 20.

Each of the first battery module 81 and the second battery module 82 may contain a number of cell stack monitoring chips. As depicted in FIG. 6, the first battery module 81 and the second battery module 82 each contain three cell stack monitoring chips to each monitor thirteen cells. Within Battery Module A, cell stack monitor chip 1A 83 may be responsible for monitoring battery cells 1-13 84; cell stack monitor chip 2A 85 may be responsible for monitoring battery cells 14-26 86; and cell stack monitor chip 3A 87 may be responsible for monitoring battery cells 27-39 88. Within Battery Module B, cell stack monitor chip 1B 89 may be responsible for monitoring battery cells 1-13 90; cell stack monitor chip 2B 91 may be responsible for monitoring battery cells 14-26 92; and cell stack monitor chip 3B 93 may be responsible for monitoring battery cells 27-39 94. The cell stack monitor chips may be connected together in order, as depicted in FIG. 6, through the communication interface.

When data is communicated through the ring communication network 50 of FIG. 6, each of the cell stack monitor chips may add data onto a stack. The data may contain cell numbers corresponding to the battery cells for each stack. As depicted in FIG. 6, the auxiliary memory chip 36 is contained within the first cell stack monitor chip of the cell monitoring unit 30. Cell stack monitor chip 1A 83 and cell stack monitor chip 1B 83 each contain the auxiliary memory chip 36. The battery management unit 20 may be programmed to expect a specific data stack order, and may also be programmed to check for the auxiliary memory chip 36 as each chip adds data to the stack. For example, in the proper connected orientation of FIG. 6, cell stack monitor chip 1A 83 adds data from battery cells 1-13 84 and indicates that the auxiliary memory chip 36 is present. Cell stack monitor chip 2A 85 and cell stack monitor chip 3A 87 subsequently add data from battery cells 14-26 86 and battery cells 27-39 88 and each indicate that the auxiliary memory chip 36 is not present. Cell stack monitor chip 1B 89 then adds data from battery cells 1-13 90 and indicates that the auxiliary memory chip 36 is present. Cell stack monitor chip 2B 91 and cell stack monitor chip 3B 93 then also subsequently add data from battery cells 14-26 92 and battery cells 27-39 94 and each indicate that the auxiliary memory chip 36 is not present. The battery management unit 20 may recognize that this data stack contains a proper order for the battery cells, and therefore may determine that the ring communication network 50 has been connected in a correct orientation, and is in proper working condition.

FIG. 7 depicts the ring communication network 50 with the components incorrectly connected according to the predetermined configuration stored within the battery manage-
ment unit 20. In the depiction of FIG. 7, the second battery
module 82 has been incorrectly reconnected. This condition
may occur in several different scenarios, for example, if the
second battery module 82 has been disconnected from the
ring communication network 50 in order to be serviced. As
shown in FIG. 7, the incorrect arrangement is a result of the
second battery port 32 of the first battery module 81 being
connected to the second battery port 32 of the second battery
module 82 through the communication interface 40. The
incorrect arrangement also includes the first battery port 31
of the second battery module 82 being connected to the
second port 22 of the battery management unit 20.

As with the depiction in FIG. 6, in the incorrect arrange-
ment of FIG. 7, data is communicated through the ring
communication network 50 through the communication
interface 40 from the battery management unit 20 to the first
battery module 81, to the second battery module 82, and
back to the battery management unit 20. As with the correct
arrangement, the incorrect arrangement depicted in FIG. 7
depicts the auxiliary memory chip 36 contained within the
first cell stack monitor chip of the cell monitoring unit 30.
In FIG. 7 as well, cell stack monitor chip 1A 83 and cell
stack monitor chip 1B 83 each contain the auxiliary memory
chip 36. The battery management unit 20 of FIG. 7 is
programmed to expect the same specific data stack order and
the same location of the auxiliary memory chip 36 that of
FIG. 6. However, in the incorrect arrangement of FIG. 7, cell
stack monitor chip 1A 83 adds data from battery cells 1-13
84 and indicates that the auxiliary memory chip 36 is
present. Cell stack monitor chip 2A 85 and cell stack
monitor chip 3A 87 subsequently add data from battery cells
14-26 86 and battery cells 27-39 88 and each indicate that
the auxiliary memory chip 36 is not present. Due to the
incorrect connection of the communication interface 40, cell
stack monitor chip 3B 93 then adds data from battery cells
27-39 94 and indicates that the auxiliary memory chip 36 is
not present. Cell stack monitor chip 2B 91 subsequently
adds data from battery cells 14-26 92, indicating that the
auxiliary memory chip 36 is not present. Cell stack monitor
chip 1B 89 then adds data from battery cells 1-13 90 and
indicates that the auxiliary memory chip 36 is present.

The battery management unit 20 may receive the data
stack and correctly interpret that the stack data from cell
stack monitor chip 1B 89 and cell stack monitor chip 3B 93
have been swapped. The battery management unit 20 may
then rearrange the data stack into a correct order, as it
recognizes positive indication of the auxiliary memory chip
36 contained the stack data from cell stack monitor chip 1B
89. The battery management unit 20 may also indicate to an
operator that the second battery module 82 has been incor-
rectly reinstalled, and service personnel may be alerted to
remedy the reinstallation.

Industrial Applicability

In operation, the teachings of the present disclosure can
find applicability in many industries by not limited to on and
off highway vehicles, power generation, construction, min-
ing, agricultural, construction, and earth moving industries.
While depicted and described in conjunction with a vehicle,
such teaching can also find applicability with other machines
utilizing battery management systems.

Figure 8:
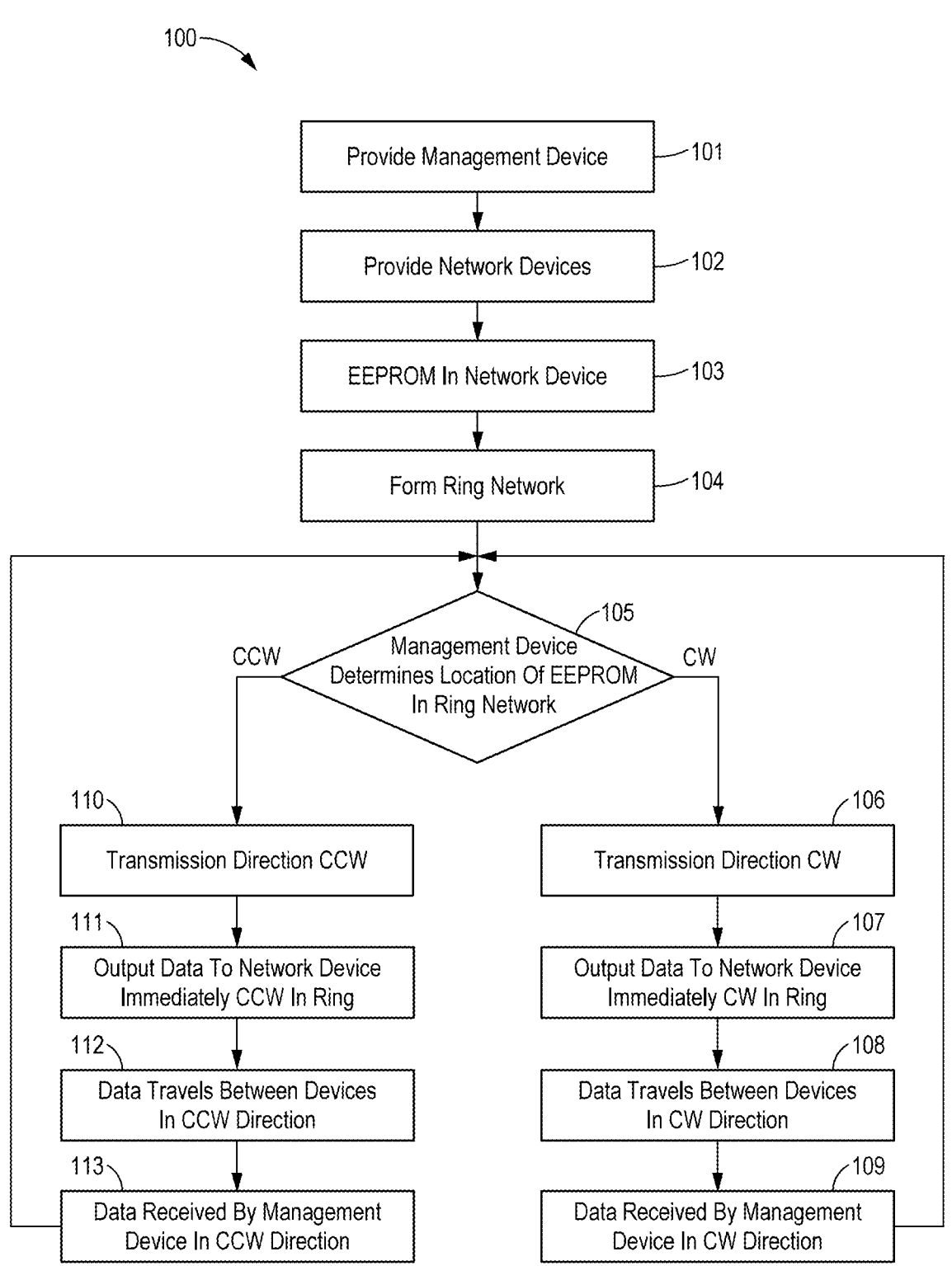
FIG. 8 is a flowchart depicting a sample sequence of steps for operating a battery management system as a ring communication network which may be practiced in accordance with the battery management system of the present disclosure.

FIG. 8 illustrates a visual representation of a method 100
of operating the ring communication network 50 which
forms the battery management system including the battery
management unit 20 and the cell monitoring unit 30. In a first step 101, and second step 102, a management device in
the form of the battery management unit 20, and a network
device in the form of the cell monitoring unit 30 may be
provided.

The management device has a first processor, a first
memory, and a first communicator, and a computer program
in the forms of the processor 24, the memory, 25, and the
transmitter 26 of the battery management unit 20 for execut-
ing and transmitting programming stored in the memory 25.
Similarly, the network device has a network processor, a
network memory, and a network communicator in the forms
of the processor 34, the memory 35, and the transmitter 37
of the cell monitoring unit 30.

In a third step 103, an auxiliary memory in the form of the
auxiliary memory chip 36 is disposed in the cell monitoring
unit 30. The battery management unit 20 and the cell
monitoring unit 30, in a fourth step 104, are organized and
arranged to form the ring communication network 50, and
interconnected through the communication interface 40. As
depicted in FIGS. 4-5, a plurality of the cell monitoring unit
30 may be utilized to form the ring communication network
50 with a single of the battery management unit 20 control-
ling.

In a fifth step 105, battery management unit 20 as the
management device determines the location of the auxiliary
memory chip 36 within the ring communication network 50.
As shown in FIGS. 4-5, the location may be closer to the
battery management unit 20 in either the clockwise direction
27 or the counter-clockwise direction about the ring com-
munication network 50.

The battery management unit 20 may assign the trans-
mission direction in the clockwise direction 27, in a sixth
step 106, as depicted in FIG. 4. As shown, in a seventh step
107, the battery management unit 20 directs dataflow in the
clockwise direction 27 such that data is output to an adjacent
of the cell monitoring unit 30. In an eighth step 108, data
travels between adjacent of the cell monitoring unit 30 along
the ring communication network 50 in the clockwise direc-
tion 27, and is received again by the battery management
unit 20 in a ninth step 109.

However, as a result of the fifth step 105, the battery
management unit 20 may assign the transmission direction
in the counter-clockwise direction 28, in a tenth step 110, as
depicted in FIG. 5. As shown, in an eleventh step 111, the
battery management unit 20 directs dataflow in the counter-
clockwise direction 28 such that data is output to an adjacent
of the cell monitoring unit 30. In a twelfth step 112, data
travels between adjacent of the cell monitoring unit 30 along
the ring communication network 50 in the counter-clock-
wise direction 28, and is received again by the battery
management unit 20 in a thirteenth step 113. The fifth step
105 may then repeated at pre-determined intervals.

The method 100 of operating the ring communication
network 50 allows for simplicity in the design of the
components within the ring communication network 50. By
performing a dataflow detection and assignment by deter-
mining the location of the auxiliary memory chip 36, the
battery management unit 20 and the cell monitoring unit 30
can perform efficient management utilizing programming
and software rather than additional hardware requirements.
In this manner, communication between the battery man-
agement unit 20 and any of a number of the cell monitoring
unit 30 is simplified.

It should be evident that this disclosure is by way of
example and that various changes may be made by adding,
modifying or eliminating details without departing from the
fair scope of the teaching contained in this disclosure. The invention is therefore not limited to particular details of this disclosure except to the extent that the following claims are necessarily so limited.

What is claimed is:

1. A method of operating a ring communication network, comprising:

providing a management device having a first processor, a first memory, a first communicator, and a computer program stored in the first memory and capable of running on the first processor;

providing a network device having a network processor, a network memory, and a network communicator;

disposing an auxiliary memory chip in the network device;

connecting the management device and the network device to form the ring communication network;

generating, by the auxiliary memory chip, a signal based on a triggering condition associated with the network device;

providing, by the network device, the signal to the management device;

determining, by the management device and based on the signal, a location of the auxiliary memory chip in the ring communication network;

assigning, by the management device and based on the location of the auxiliary memory chip, a transmission direction such that a transmission distance between the management device and the auxiliary memory is minimized; and outputting control data from the management device to the network device in the assigned transmission direction to control a component connected to the network device.

2. The method of claim 1, wherein the triggering condition includes at least one of:

the network device malfunctioning, or the networking device having been incorrectly assembled.

3. The method of claim 1, further comprising outputting maintenance data from the management device to the network device to determine if the network device requires service.

4. The method of claim 1, wherein providing the network device further comprises providing a plurality of network devices, each including the network processor, the network memory, and the network communicator.

5. The method of claim 4, wherein disposing the auxiliary memory chip further comprises disposing the auxiliary memory chip in one of the plurality of network devices.

6. The method of claim 1, wherein assigning the transmission direction further comprises assigning the transmission direction in a clockwise direction along the ring communication network.

7. The method of claim 1, wherein assigning the transmission direction further comprises assigning the transmission direction in a counter-clockwise direction along the ring communication network.

8. A battery management system, comprising:

a battery management unit, including a management computer;

a cell monitoring unit, including a battery computer and an auxiliary memory chip; and a communication interface disposed between the battery management unit and the cell monitoring unit forming a ring communication network with the battery management unit and the cell monitoring unit;

the battery management unit configured to determine if the cell monitoring unit is no longer in working condition by:

receiving a signal from the cell monitoring unit, the signal generated by the auxiliary memory chip based on a triggering condition associated with the cell monitoring unit;

determining a location of the auxiliary memory chip in the ring communication network based on the signal;

assigning, based on the location of the auxiliary memory chip, a transmission direction along the ring communication network such that a distance between the management computer and the auxiliary memory chip is minimized; and sending a management signal from the battery management unit to the cell monitoring unit along the ring communication network in the transmission direction.

9. The battery management system of claim 8, wherein the communication interface is an isolated serial peripheral interface communication protocol.

10. The battery management system of claim 8, wherein the cell monitoring unit comprises a plurality of cell monitoring units.

11. The battery management system of claim 10, wherein the auxiliary memory chip is housed within only one of the plurality of cell monitoring units.

12. The battery management system of claim 11, wherein the auxiliary memory chip is housed within one of the plurality of cell monitoring units that is closer to the battery management unit along the ring communication network in either a clockwise direction or a counter-clockwise direction around the ring communication network, and the battery management system is configured to determine that the transmission direction is in the clockwise direction or the counter-clockwise direction.

13. The battery management system of claim 8, wherein the management signal further comprises a control signal, the battery computer being configured to receive the control signal and regulate a voltage of the cell monitoring unit.

14. The battery management system of claim 8, wherein the management signal further comprises a maintenance signal, the battery computer being configured to receive the maintenance signal and verify with the battery management unit that the cell monitoring unit is in proper working condition.

15. A vehicle, comprising a frame;

an operator cabin mounted on the frame;

a controller configured to control operation of the vehicle;

a battery management unit mounted to the frame and connected to the controller, including a management computer;

a cell monitoring unit mounted to the frame, including a battery computer and an auxiliary memory chip; and a communication interface connecting the battery management unit and the cell monitoring unit, configured such that the battery management unit and the cell monitoring unit are organized in a ring communication network;

the battery management unit configured to determine if the cell monitoring unit is no longer in working condition by:

receiving a signal from the cell monitoring unit, the signal generated by the auxiliary memory chip based on a triggering condition associated with the cell monitoring unit;

determining a location of the auxiliary memory chip in the ring communication network based on the signal;

assigning, based on the location of the auxiliary memory chip, a transmission direction along the ring communication network such that a distance between the management computer and the auxiliary memory chip is minimized; and sending a management signal from the battery management unit to the cell monitoring unit along the ring communication network in the transmission direction.

16. The vehicle of claim 15, wherein the communication interface is mounted to the frame, and is an isolated serial peripheral interface communication protocol.

17. The vehicle of claim 15, wherein the cell monitoring unit further comprises a plurality of cell monitoring units mounted to the frame.

18. The vehicle of claim 17, wherein the auxiliary memory chip further comprises an electrically erasable programmable read-only memory chip housed within only one of the plurality of cell monitoring units.

19. The vehicle of claim 18, wherein the auxiliary memory chip is housed within one of the plurality of cell monitoring units that is closer to the battery management unit along the ring communication network in either a clockwise direction or a counter-clockwise direction around the ring communication network, and the battery management unit is configured to determine that the transmission direction is in the clockwise direction or the counter-clockwise direction.

20. The vehicle of claim 15, wherein the management signal further comprises a maintenance signal, the battery computer being configured to receive the maintenance signal and verify with the battery management unit that the cell monitoring unit is in proper working condition.

* * * * *